July 30, 1929.    A. C. HYNAN    1,722,750
DEMOUNTABLE WHEEL
Filed Oct. 24, 1927    2 Sheets-Sheet 2

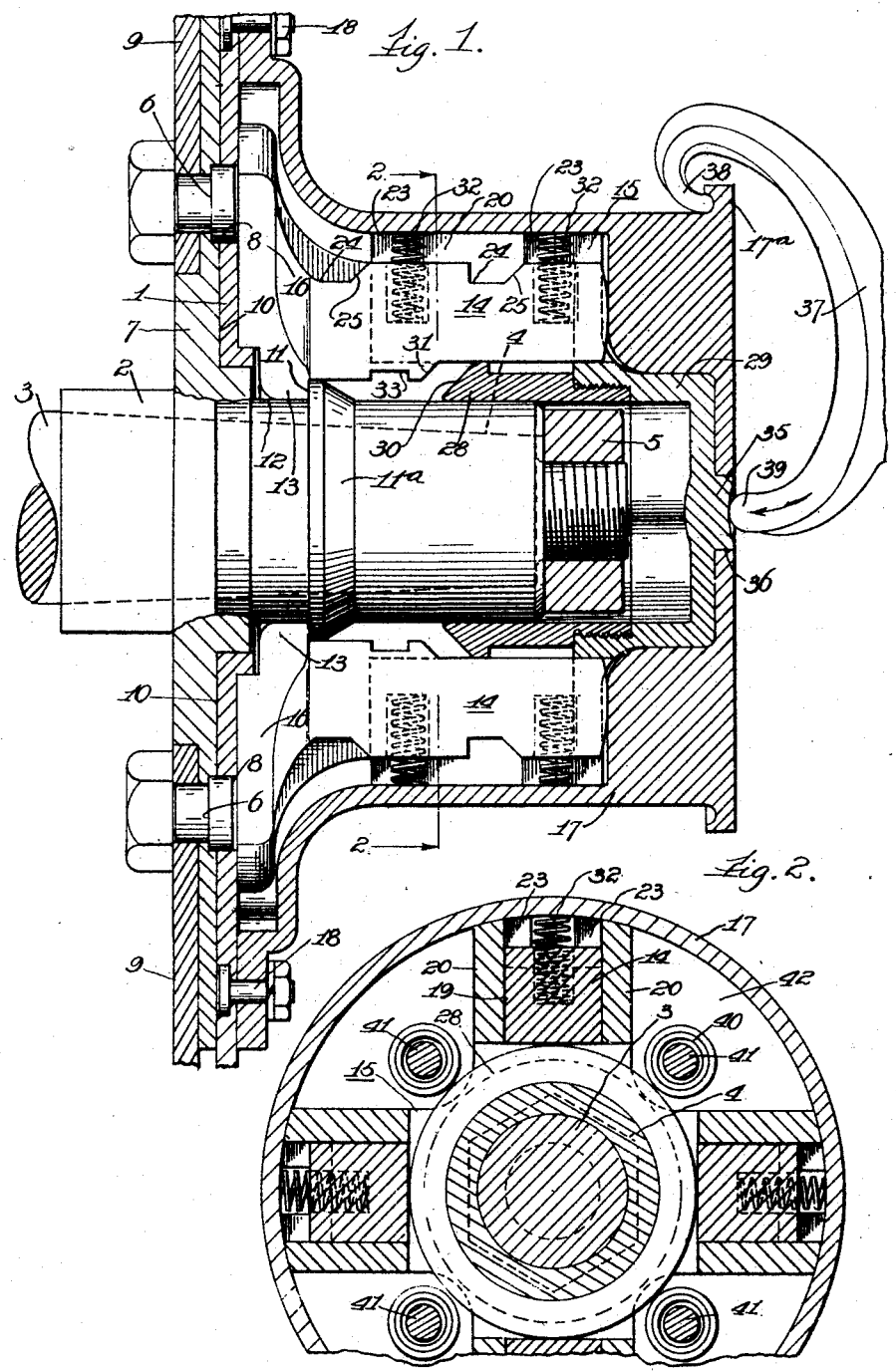

Witness
J. C. McKnight

Inventor.
Arthur C Hynan.
by Burton & Burton
his Attorneys.

Patented July 30, 1929.

1,722,750

UNITED STATES PATENT OFFICE.

ARTHUR C. HYNAN, OF CHICAGO, ILLINOIS.

DEMOUNTABLE WHEEL.

Application filed October 24, 1927. Serial No. 228,121.

The present invention relates to means for detachably mounting a wheel on a hub and adapted for use with vehicle wheels particularly of the type employed on automobiles, trucks, busses and the like, and it has for its object to provide an improved construction, wherein the wheel may be quickly detached from the hub and may also be quickly mounted and locked thereon in an automatic manner without adjustment. It consists in certain features and elements of construction herein shown and described, as indicated in the claims.

In the drawings:

Figure 1 is an axial fragmentary section through a disk wheel of the automobile type, embodying my improved detachable wheel construction, showing the wheel in locked position on the hub.

Figure 2 is a transaxial section through the mechanism taken substantially as indicated by line 2—2, Figure 1.

Figure 3:
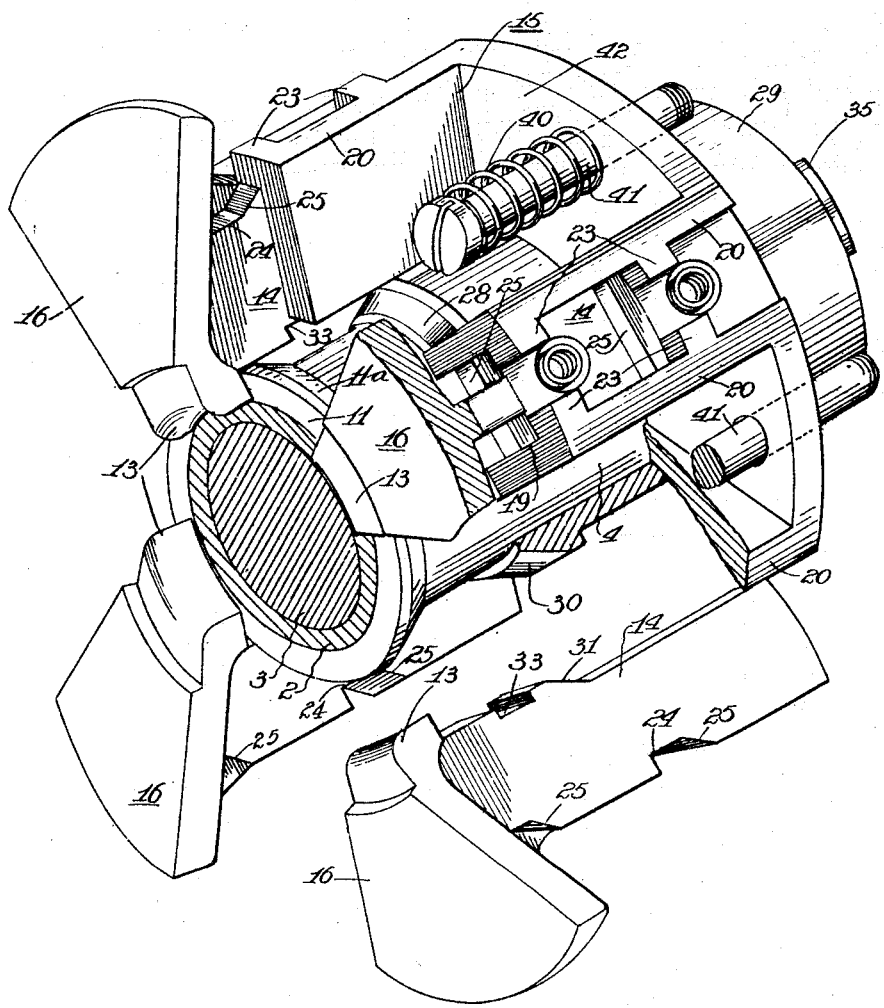
Figure 3 is a perspective framentary view of my improved mechanism with the housing removed and parts broken away to show the relative association of the parts.

The construction as embodied in the present invention is, in general, similar to that disclosed in my copending applications, Serial No. 716,187, filed May 27, 1924, and Serial No. 180,968, filed April 4, 1927, and more specifically is directed to improvements thereover, involving a more positive, simplified and durable construction, in a compact arrangement in which the entire mechanism lies substantially within the plane of the tire on the wheel. Referring now to the drawings, I have shown for purpose of illustration the central portion of a disk type automobile wheel indicated at 1, detachably mounted on a hub portion 2. The hub portion is provided with a tapered bore for mounting on the end portion, 3, of a driving axle such as the usual rear axle of an automobile, and includes an outwardly extending cylindrical sleeve, 4, to provide a shoulder for securing said hub on the axle by a nut, 5, threaded on the end of said axle. The wheel proper is driven by the heads of studs, 6, extending outwardly from the hub flange, 7, and engaging in apertures, 8, formed in the disk, 1, transmitting the driving torque from the axle to the wheel. The studs, 6, also serve for attaching the brake drum indicated at, 9, to the hub flange, 7. This hub flange, 7, is provided with an outwardly facing annular shoulder, 10, against which the disk, 1, is tightly fitted when in locked position, and an inwardly facing annular shoulder, 11, is provided on the hub extension, 4, the space between said shoulders defining a locking groove, 12, engageable by the jaws, 13, of locking dogs, 14, which are slidably carried in a movable member, 15. As may be seen in Figures 1 and 3, the portion of the jaws, 13, engaging the shoulder, 10, on the hub flange, are fan shaped as indicated at 16, and contact with a relatively large area of the disk, 1, and distribute the torsional strains over a greater area and at the same time reduce the driving torque at the apertures, 8. Thus, it will be clear that when the jaws, 13 and 16, are interposed between the shoulders, 10 and 11, the wheel is positively locked to the hub in driving positions, as illustrated in Figure 1.

The movable member, 15, is axially slidable on the sleeve extension 4, and on the inner surface of a hub cap or housing, 17, which is closed at the outer end, the opposite end being flared for permanent attachment to the disk, 1, by bolts, 18. The number of locking dogs, 13, may be varied to suit, the construction herein shown including four dogs, spaced at equal angles relative to the locking groove. These dogs are radially movable in the member, 15, and during this movement are maintained in true guidance by the ways, 19, formed by the outwardly extending ribs, 20, of said member. Further, the radial movement of these dogs is parallel to the axis of the axle at all times. This parallel relation of the locking dogs is maintained by a pair of axially spaced retaining dogs, 23, integral with the ribs, 20, of the member, 15, for each of said locking dogs. Said retaining dogs are formed adjacent the outer edge of the rib on the inside of the ways, in pairs, facing each other. Normally in wheel locking position, these retaining dogs, 23, contact the upper surface of the shanks of the locking dogs, 14, and maintain the jaws, 13, and 16, locked in the groove, 12. Notches, 24, are provided in the upper edge of the shanks of the locking dogs, 14, immediately forward of the retaining dogs, 23, when in retaining position, as shown in Figure 1. These notches are positioned, so that when the member, 15, is axially moved to unlocking position the retaining dogs, 23, will be aligned with said notches, freeing the locking dogs, 14, and permitting the same to be moved radially outward. Each of these notches are cut back as indicated at, 25, to provide clearance and permit the locking dogs, 14, to be moved radially during the axial movement of said member, 15, as will be presently described.

An annular cam, 28, slidable on the hub extension, 4, is threaded into a reduced portion, 29, of the member, 15, and axially movable therewith. Of course this cam could be integral with the member, 15, but to facilitate assembly and manufacture it is made as a separate unit. As the annular cam, 28, is axially moved with the member, 15, its tapered camming surface, 30, contacts with the oppositely tapered cam surface, 31, projecting from the under edge of the shank of the locking dog, 14, and moves the latter radially outward, carrying the jaws, 13 and 16, out of locking engagement with the groove, 12, beyond the shoulder, 11, for freeing the wheel from the hub. Simultaneous with the camming action the retaining dogs, 23, are moved out of registration with the portions of the dogs, 14, which they normally engage in locked position, freeing the locking dogs, 14, and aligning with the notches, 24, to permit outward radial movement of said locking dogs. A pair of axially spaced springs, 32, the interposed between the locking dogs and the housing, 17, and yieldingly oppose the outward radial movement of said dogs and tend to maintain the same in locking position. These springs are also positioned to permit clearance of the retaining dogs, 23, to pass on opposite sides. After the locking dogs have been spread radially to relieve the jaws from the groove, they are maintained in unlocked position against the reaction of springs, 32, by the cam, 28, passing beyond the cam surface, 31, of the dogs, 14, and engaging in notches, 33, in the inner edge of said dogs.

The outer ends of the locking dogs, 14, which have sliding contact with the inside of the end of housing, 17, are rounded so that the frictional contact will be materially reduced, and permit easy and free radial movement of said dogs. The reduced end portion, 29, of the member, 15, has sliding support in the housing, 17 and is provided with a central plunger boss, 35, extending through a central aperture, 36, in said housing, to which boss pressure may be applied for sliding the movable member, 15, and cam, 28, axially, to release the locking dogs. For convenience the plunger boss, 35, may be actuated by a tool, 37, having a forked end, 38, for engaging the flange, 17ª, of the housing, 17, while the other end, 39, contacts with the plunger boss for depressing the same. A quick movement of the tool will release the locking mechanism and tend to separate the wheel from its hub.

Axially extending springs, 40, are mounted on screws, 41, loosely extending through trans-axial ribs, 42, of the member, 15, and threaded into the end of the housing, 17. As the member, 15, and cam, 28, are axially moved by the releasing tool, 37, the springs, 40, will be compressed and be held in such position during the time the locking dogs are in open position.

After the cam, 28, contacts with cam, 31, at the extreme position, the jaws, 13, are open just enough to permit the shoulder, 11, of the hub to slide therethrough, but after the shoulder, 11, is freed from the dogs, 14, the cam, 28, engages the notch, 33, permitting the locking dogs to partially close by the reaction of the springs, 32. When the wheel is mounted on the hub, the outwardly tapered cam surface, 11ª, of shoulder, 11, forces the jaws, 13, open, which frees the cam, 28, from the notches, 33, which cam and movable member, 15, are then yieldingly forced to normal locking position by the compressed springs, 40, and at the same time, the movable member with its retaining dogs, 23, tends to force the locking dogs into locking position in the groove, 12, with the assistance of the springs, 32. The inclined cut back portion, 25, of the notches, 24, in the locking dogs, act as a cam surface for the retaining dogs, 23, for gradually forcing the dogs, 14, downwardly into locking position. Thus by merely sliding the wheel onto the hub it is automatically locked into driving position therewith.

I claim:

1. In combination with a wheel and a separable hub therefor, an axle on which the hub is mounted, said hub having an annular shoulder facing inwardly with respect to the end of the axle, the wheel having an outwardly facing shoulder, thereby forming a groove between said shoulders, said hub having an outward extension beyond the shoulder, a member mounted on the wheel and axially movable relative thereto, a plurality of locking dogs slidably mounted in said member, positioned for engaging in the groove for locking the wheel on the hub, an annular cam, loose on the hub extension and connected to the member and movable axially therewith for engaging said dogs and moving the same radially outward out of engagement with the groove for releasing the wheel from the hub.

2. In combination with a wheel and a detachable hub portion, an axle on which the hub is mounted, said hub having an inwardly facing annular shoulder, and the wheel having an outwardly facing shoulder, a housing associated with the wheel, a locking dog in the housing checked against axial movement therein and formed with a portion engageable between the oppositely facing shoulders of the hub and wheel; an axially movable member formed with a guideway in which said dog is radially movable into and out of engagement with said shoulders, said members having lugs overhanging the outer surface of said dog for holding it positively in locking position and the dog having recesses registerable with said lugs when the said member is moved axially in the housing.

3. In the combination defined in claim 2, a spring reacting between the dog and the housing to urge the dog into locking position, said lugs being spaced apart in circumferential direction in the housing to accommodate the spring.

4. In the combination defined in claim 2, a pair of springs reacting between the housing and the dog at longitudinally spaced positions, said lugs being disposed in pairs adjacent each of said springs and spaced apart in circumferential direction to accommodate the springs.

5. In the combination defined in claim 2, said dog having a beveled shoulder facing the axis of the hub, a beveled sleeve yieldingly slidable on the hub to act as a cam against said shoulder to move the dog outwardly, and transaxial faces on the sleeve and dog respectively engageable to hold the sleeve against return after its sliding movement has shifted the dog to its outer position.

6. In combination with a wheel and a detachable hub portion, an axle on which the hub is mounted, said hub having an inwardly facing annular shoulder the wheel having an outwardly facing shoulder, the space between said shoulders defining a groove, said hub portion having an extension beyond the shoulder, a member movably mounted on the wheel having a plurality of outwardly open guide ways, locking dogs slidably mounted in said ways and positioned for engaging the groove for locking the wheel on the hub, a cam loosely mounted on said hub extension, connected to said member and axially movable therewith for impinging against said dogs to move the same radially outward with the guidance of said ways, in substantially parallel relation to the axle for releasing the wheel from the hub.

7. In the combination defined in claim 6, a pair of axially spaced springs in contact with each dog, normally opposing the radial outward movement thereof, and tending to yieldingly force said dogs into locking position in the groove.

8. In combination with a wheel and a detachable hub therefor, an axle on which said hub is mounted, said hub having an annular inwardly facing shoulder and an extension beyond said shoulder, an outwardly facing shoulder on the wheel, the shoulders on the hub and wheel forming a groove therebetween, a member carried on the wheel and axially movable with respect thereto, said member being provided with a plurality of outwardly open ways, a plurality of locking dogs slidably supported and mounted for guidance in said ways and dimensioned to fit in the groove for locking the wheel to the hub portion, a cam on said hub extension, connected to said member and axially movable therewith for moving said dogs radially outward in said ways parallel to the axle for disengaging the wheel from the hub portion and maintaining the same in such disengaged position, and a housing connected to the wheel enclosing said mechanism, said dogs being dimensioned to have sliding engagement with the inside of the outer end of the housing and the shouldered part of the wheel in their radial movement.

9. In the combination defined in claim 8, the ends of said dogs in contact with the shoulder on the wheel being enlarged for engaging a relatively large central area of said wheel to distribute the locking strains over a relatively large area.

10. In the combination defined in claim 2, an actuator axially movable over the hub and adapted for causing radial movement of the locking dog outwardly to release it from between said oppositely facing shoulders of the hub and wheel, means automatically retaining said actuator and the dog in such position while the wheel is removed from its hub together with a sloping approach for the annular shoulder of the hub adapted to shift the dog radially and release the actuator when the wheel is re-applied on the hub.

ARTHUR C. HYNAN.